United States Patent
Nishide et al.

(10) Patent No.: US 9,094,574 B2
(45) Date of Patent: Jul. 28, 2015

(54) INFORMATION PROCESSING APPARATUS, CONFERENCE SYSTEM, AND COMPUTER PROGRAM PRODUCTS

(71) Applicants: Kohichi Nishide, Tokyo (JP); Takeshi Fujita, Tokyo (JP); Yasuharu Yanamura, Kanagawa (JP); Yohei Fujita, Kanagawa (JP); Tetsuro Kutsuwada, Kanagawa (JP); Akira Masuda, Tokyo (JP)

(72) Inventors: Kohichi Nishide, Tokyo (JP); Takeshi Fujita, Tokyo (JP); Yasuharu Yanamura, Kanagawa (JP); Yohei Fujita, Kanagawa (JP); Tetsuro Kutsuwada, Kanagawa (JP); Akira Masuda, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 94 days.

(21) Appl. No.: 13/915,889

(22) Filed: Jun. 12, 2013

(65) Prior Publication Data
US 2013/0335517 A1 Dec. 19, 2013

(30) Foreign Application Priority Data

Jun. 13, 2012 (JP) ................................ 2012-133668

(51) Int. Cl.
*H04N 7/15* (2006.01)
*H04L 12/18* (2006.01)

(52) U.S. Cl.
CPC .............. *H04N 7/15* (2013.01); *H04L 12/1827* (2013.01)

(58) Field of Classification Search
CPC ....... H04L 12/1827; H04N 7/15; H04N 7/152
USPC ............................................. 348/14.01–14.16
See application file for complete search history.

(56) References Cited

U.S. PATENT DOCUMENTS

| 7,529,270 B2 | 5/2009 | Uramatsu et al. |
| 2011/0161836 A1* | 6/2011 | Mu et al. ................... 715/756 |
| 2013/0208663 A1* | 8/2013 | Kanniappan et al. ......... 370/329 |

FOREIGN PATENT DOCUMENTS

| JP | 3852752 | 9/2006 |
| JP | 2011-041153 | 2/2011 |

* cited by examiner

*Primary Examiner* — Melur Ramakrishnaiah
(74) *Attorney, Agent, or Firm* — Oblon, McClelland, Maier & Neustadt, L.L.P.

(57) ABSTRACT

An information processing apparatus which controls transmission and reception of information is provided. The information processing apparatus includes a transmitting and receiving unit which transmits and receives, as the information, at least one of voice information, video information, and screen information; a necessity identifying information defining unit which allocates necessity identifying information for detecting a state of the information processing apparatus and identifying presence/absence of a necessity of transmitting and receiving the voice information, the video information, and the screen information in accordance with the detected result; and a bandwidth control unit which determines a bandwidth to be allocated to each of the voice information, the video information, and the screen information to be transmitted and received, based on the necessity identifying information. The transmitting and receiving unit transmits and receives the voice information, the video information, and the screen information in accordance with the determined bandwidth.

19 Claims, 14 Drawing Sheets

FIG.5

| INFORMATION TRANSMITTED/RECEIVED | NECESSARY BANDWIDTH (kbps) | NECESSITY IDENTIFIER | PRIORITY | BANDWIDTH AFTER FILTERING (kbps) |
|---|---|---|---|---|
| VOICE INFORMATION | 130 | 1 | 1 | 130 |
| VIDEO INFORMATION | 428 | 0 | 2 | 0 |
| SCREEN INFORMATION | 428 | 1 | 3 | 428 |

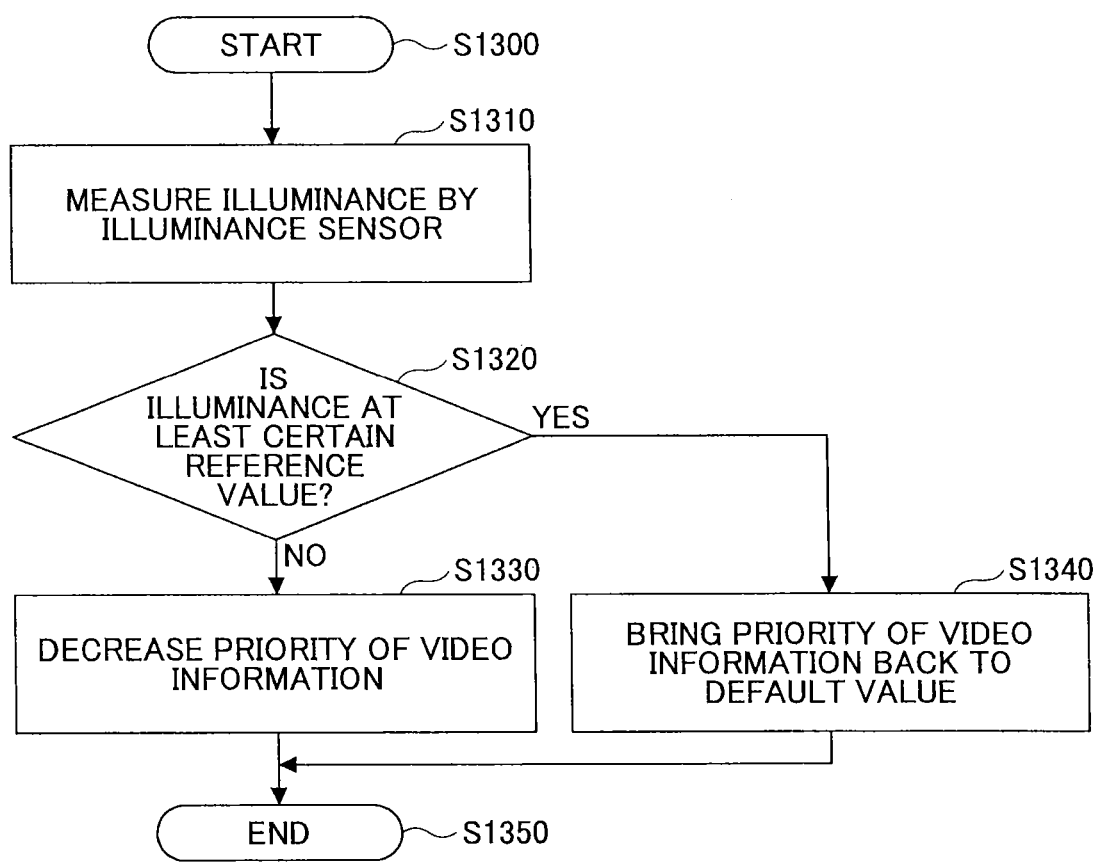

US 9,094,574 B2

INFORMATION PROCESSING APPARATUS, CONFERENCE SYSTEM, AND COMPUTER PROGRAM PRODUCTS

TECHNICAL FIELD

The present invention relates to information processing apparatuses which perform control of transmission and reception of information; conference systems which include two or more of the information processing apparatuses, and computer program products for realizing the control that are readable by the information processing apparatuses.

BACKGROUND ART

As a tool for conferencing with a counterpart at a remote location, a videoconference system is used. The videoconference system is configured to include multiple information processing apparatuses connected to a network, and a server for relaying and managing communications among the information processing apparatuses. The respective information processing apparatuses include a monitor as a display apparatus for displaying various information sets; a microphone for inputting voice; and a camera for imaging. The monitor is provided with a speaker for outputting the voice.

A participant of a conference transmits, to an information processing apparatus used by a counterpart as voice information and video information, voice input by the microphone of the information processing apparatus used by the participant and video imaged by the camera. Then, the voice information and the video information of the counterpart are received from the information processing apparatus used by the counterpart. Video information sets which are mutually received are displayed on the respective monitors, while voice information sets which are mutually received are output from a speaker provided by the respective monitors. This makes it possible to have communications with the counterpart.

The information processing apparatus may display conference material such as a drawing, a table, etc., that are prepared using an arbitrary application on a screen of a monitor. The displayed conference material may be transmitted as screen information to an information processing apparatus used by the counterpart and displayed on the monitor. When the monitor is provided with a touch panel, a stylus, etc., it may be used to draw a letter, a drawing, etc., on the conference material displayed, and the drawn information may also be included in the screen information to transmit and receive the screen information.

In this way, in the videoconference system, multiple information sets such as the voice information, the video information, and the screen information may be transmitted and received via a network. In recent years, with an increase in quality of these information sets, it is becoming easier to see an expression of the counterpart, the material, etc., and also to hear the voice. On the other hand, there are problems which cause a delay of a conference, such as an increase in an amount of information transmitted and received, a load on a network, an interruption in the middle of voice, video, etc. For content of the material or the video of the counterpart, even if there is an interruption in the middle of the material or the video, it does not become a major problem as long as it is for a short period of time. However, for voice, a problem arises since the content becomes unrecognizable even for a short time.

In light of the problems described above, a network conference system is proposed which makes it possible for voice information to be transmitted and received adequately and smoothly, and conducts a conference without voice of a user being interrupted even when display information with a large amount of information is transmitted and received in addition to the voice information and monitor video information. (See Patent Document 1, for example)

This network conference system includes a bandwidth control apparatus, which bandwidth control apparatus monitors a bandwidth used in transmission and reception of the respective information sets, and, when an amount of information has at least a certain value, a processing content code of a priority definition file is referred to, a proper bandwidth for each information set is set, and the bandwidths for the respective information sets are controlled based thereon. As the priority definition file is defined to decrease, during transmission and reception, a processing priority in the order of voice information, drawing information, and monitor video information, the voice information is given the highest priority, making it possible to prevent voice from being interrupted and to smoothly proceed with the conference.

However, it is not necessarily the case that all participants participating in the conference need all of the voice information, the video information, and the screen information. A participant uses a cell phone as an information processing apparatus by causing the cell phone to be in proximity to the ears without looking at a screen, so that it suffices to transmit and receive only the voice information. Moreover, when a microphone or camera function is turned OFF, the voice information or the video information is not obtained, so it is not possible to transmit such information. Allocating a bandwidth for transmitting and receiving such unneeded information causes bandwidth utilization efficiency to decrease, wastefully places a burden on a network, and interrupts voice, etc., possibly causing a delay of a conference.

Moreover, the priority definition file is defined to decrease the processing priority in the order of the voice information, the video information, and the screen information and the priority is fixed, so that it is not possible to change the definition so as to decrease the voice information to a lowest processing priority even when a speaker function is turned OFF and receiving of the voice information is unnecessary. Therefore, a bandwidth is allocated for receiving the voice information with a highest priority even when the speaker function is OFF. This also decreases bandwidth utilization efficiency.

The information processing apparatuses consume much power when transmitting and receiving information. Of these information processing apparatuses, for a notebook PC, a tablet terminal, a smart phone, and a cell phone which use a battery, the battery energy decreases quickly due to transmitting and receiving of such unneeded information, possibly causing the battery energy to run out in the middle of the conference. This causes battery energy consumption efficiency to be low and the conference to not be conducted adequately.

Thus, provision of an apparatus which makes it possible to control transmitting and receiving of information and increase battery energy consumption efficiency or bandwidth utilization efficiency without transmitting and receiving unneeded information is called for.

RELATED ART DOCUMENT

Patent Document

Patent Document 1: JP3852752B

DISCLOSURE OF THE INVENTION

In light of the problems as described above, an object of an embodiment of the present invention is to provide an information processing apparatus which controls transmission and reception of information, including a transmitting and receiving unit which transmits and receives, as the information, at least one of voice information of voice input, video information of video imaged, and screen information of a screen to be shared; a necessity identifying information defining unit which allocates necessity identifying information for detecting a state of the information processing apparatus and identifying presence/absence of a necessity of transmitting and receiving the voice information, the video information, and the screen information in accordance with the detected result; and a bandwidth control unit which determines a bandwidth to be allocated to each of the voice information, the video information, and the screen information to be transmitted and received, based on the necessity identifying information, wherein the transmitting and receiving unit transmits and receives the voice information, the video information, and the screen information in accordance with the determined bandwidth.

An information processing apparatus according to an embodiment of the present invention may be provided to increase a bandwidth available for a different application on the same apparatus while preventing transmission and reception of unneeded information, making it possible to improve management utilization efficiency. Moreover, the transmission and reception of the unneeded information may be prevented to reduce a network burden and decrease consumed energy. When the information processing apparatus is an apparatus which is equipped with a battery, battery energy consumption efficiency may be improved.

BRIEF DESCRIPTION OF THE DRAWINGS

Other objects, features, and advantages of the present invention will become more apparent from the following detailed descriptions when read in conjunction with the accompanying drawings, in which:

FIG. 5 is a diagram illustrating a relationship between the respective information sets and a bandwidth after filtering, a priority, a necessity identifier, and a necessary bandwidth.

FIG. 13 is a flowchart illustrating a flow of a process in which illuminance is measured by an illuminance sensor, and whether a result of the measuring thereof is greater than or equal to a certain reference is determined to adjust a priority of the video information.

BEST MODE FOR CARRYING OUT THE INVENTION

Below, embodiments for carrying out the present invention are described with reference to the drawings. In the respective drawings, the same letters are applied to the same elements, so that duplicate explanations may be omitted.

Figure 1:
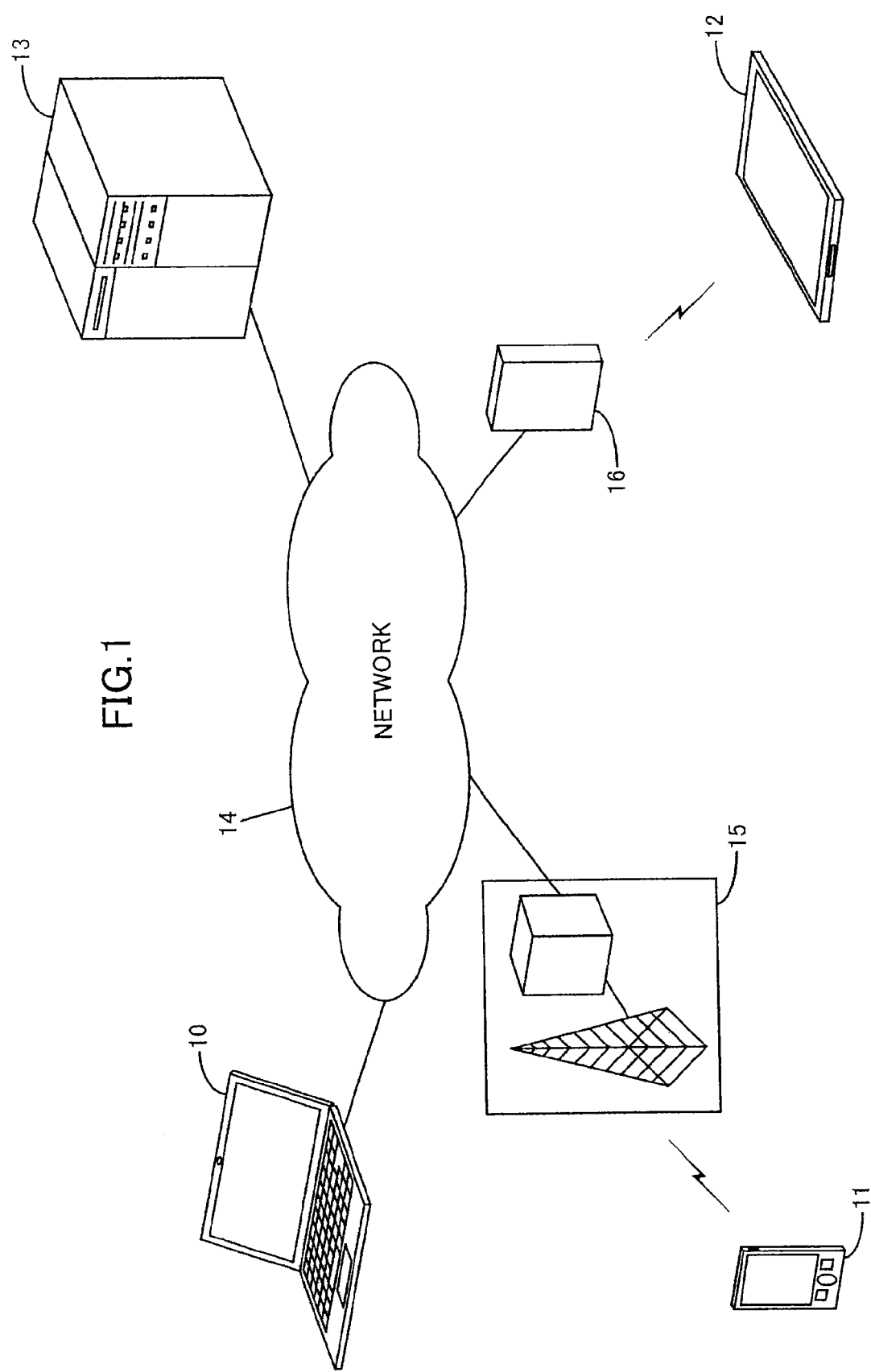
FIG. 1 is a diagram illustrating an exemplary configuration of a conference system according to the present embodiment.

FIG. 1 is a diagram illustrating an exemplary configuration of a conference system according to the present embodiment. This conference system, which is a system adopted for conducting a conference among remote locations, is configured to include multiple information processing apparatuses 10-12 and a conference server 13. The respective information processing apparatuses 10-12 are installed in mutually geographically remote regions. In FIG. 1, the respective information processing apparatuses 10-12 are configured such that they access the conference server 13 via a network 14 and mutually exchange information via the conference server 13.

While the respective information processing apparatuses 10-12 are installed in geographically remote regions in FIG. 1, the two information processing apparatuses 10 and 11 may be located in the same region, while the information processing apparatus 12 may be installed in a remote region, for example. Moreover, the information processing apparatuses 10-12 are not limited to three, so that they may be two, or at least 4.

As the respective information processing apparatuses 10-12, a PC, a smart phone, a mobile telephone, a tablet terminal, etc., which are general purpose terminals, may be used. In FIG. 1, the information processing apparatus 10, which is set to be a notebook PC, is connected to the network 14 via a communications cable. The information processing apparatus 11, which is set to be a smart phone, is configured to wirelessly communicate with a base station 15 which is connected to the network 14. The information processing apparatus 12, which is set to be a tablet terminal, is configured to wirelessly communicate with an access point 16 which is connected to the network 14.

As hardware needed for conducting the conference, the respective information processing apparatuses 10-12 include a microphone (a voice input unit) for inputting voice uttered by a user, who is a participant who participates in the conference; and a speaker (a voice output unit) for outputting voice of a counterpart. Moreover, the respective information processing apparatuses 10-12 include a camera (an imaging unit)

which images a user himself and outputs the imaged result as video; and a display or a projector (a display unit) for displaying a face of a counterpart, a screen to be shared, etc.

The respective information processing apparatuses 10-12 include a CPU for executing various processes; a storage apparatus such as a ROM, a RAM, an HDD, etc., for storing various applications, data, etc.; and a network I/F for connecting to the network 14. As the imaging unit, a CCD (charged coupled device), which is a fixed imaging element for converting light to electric charges to digitize video of a subject, may be used, and a unit other than the CCD, such as CMOS (Complementary Metal Oxide Semiconductor), etc., may be used as long as it images the subject.

The respective information processing apparatuses 10-12 transmit voice information of voice input from a voice input unit; video information of video imaged by an imaging unit; and screen information of a screen to be shared that is displayed on a display unit, and also receive these information sets from counterparts of the conference. Voice information is digital information of the voice. Video information is digital information of the video and the video may be a moving image or a still image. Moreover, the video may include both moving and still images. The voice information and the video information may be streaming delivered such that they are replayed at the same time the digital information sets of the voice and the video are received.

While the digital information of the video may be compress encoded to transmit and receive the compress encoded result, H.264/SVC may be adopted as a compress encoding technique thereof. In H.264/SVC, the digital information is encoded by dividing it into two channels and transmitting them to a counterpart, so that, in accordance with capabilities of a replay equipment unit and a state of a network, the counterpart may combine the two channels to decode the combined result to retrieve and replay the decoded result as proper digital information with no deficiency.

The screen information is, for example, digital information for displaying as conference material, such as a document, a table, an image, a moving image, etc., which is utilized using document creation software, spreadsheet software, presentation software, etc. This screen information, which is generated by taking in (capturing), at certain time intervals, material displayed in a display unit of the information processing apparatus 10, is transmitted to other information processing apparatuses 11 and 12 at certain time intervals.

The information processing apparatus 10 may display at least one of the voice information, the video information, and the screen information that are transmitted from the other information processing apparatuses 11 and 12 in at least one region within a screen of the display unit in accordance with arrangement information set in advance. The arrangement information is information on displaying of the video information and the screen information.

Transmission and reception among the information processing apparatuses 10 to 12 are conducted via the conference server 13. In conducting the conference, the conference server 13 authenticates the information processing apparatuses 10-12 and manage communications among the information processing apparatuses 10-12.

The conference server 13 includes, as hardware, a network I/F for connecting to the network 14, a CPU, and a storage apparatus such as the HDD, etc., for executing the authenticating process and management, and, as needed, includes a display as a display apparatus, a mouse or a keyboard as an input apparatus.

In a storage apparatus included by the conference server 13, an authentication management table is stored, for example. This authentication management table manages the respective passwords, associating them with apparatus IDs allocated to the respective information processing apparatuses 10-12. These apparatus IDs and passwords are for use in authenticating in logging into the conference system for conducting the conference.

In addition, into the storage apparatus is stored a destination list management table, etc., which are stored and managed together with a conference ID for identifying a conference, associating all of the apparatus IDs of the information processing apparatuses that are registered as candidates for the information processing apparatus to be a destination with an apparatus ID of the requesting information processing apparatus requesting a start of a conference.

When the user who utilizes any of the information processing apparatuses 10-12 conducts the conference, a log-in screen is opened, and a password is input therein to transmit the input result to the conference server 13 with the apparatus ID. While it is shown here that only the password and the apparatus ID are transmitted, the user ID is also input so as to be transmitted, and authentication is conducted also utilizing the user ID. The user ID and the password may include any character, number, symbol, etc.

When the apparatus ID and the password are received, the conference server 13 refers to an authentication management table, and searches for the same apparatus ID within the authentication management table, and, if located, determines whether the passwords associated thereto are the same. When the passwords are the same, an authentication process is performed to start the conference. If either or all of the apparatus IDs and the passwords are different, authentication is not possible, thereby returning the apparatus to a log-in screen.

After logging in, when a conference is selected by users who are participants of the conference, the respective information processing apparatuses 10-12 transmit a conference ID to the conference server 13 to request starting the conference. Then, the respective information processing apparatuses 10-12 transmit the voice information, the video information, and the screen information, and, in response thereto, the conference server 13 refers to a destination list management table and starts exchanging information. Below, unless otherwise noted, merely stating as information represents any of the voice information, the video information, and the screen information, or a combination thereof.

The network 14 is the Internet, for example, and communications thereof are conducted using an appropriate communications protocol such as TCP/IP, etc. The base station 15 is configured to include an antenna for transmitting and receiving a radio wave with the smart phone being the information processing apparatus 11; a converting apparatus which performs a protocol conversion, etc., for making it possible to use the smart phone on the network 14; a router which performs routing for properly transmitting and receiving information; a network I/F for connecting to the network 14, etc.

The access point 16 has a function as a wireless LAN access point, and, as a wireless LAN standard, IEEE 802.11a/b/g/n is adopted, for example. The access point 16 is configured to include a network I/F for connecting to the network 14; an antenna for conducting wireless communications; a router which performs routing for properly transmitting and receiving information, etc.

Figure 2:
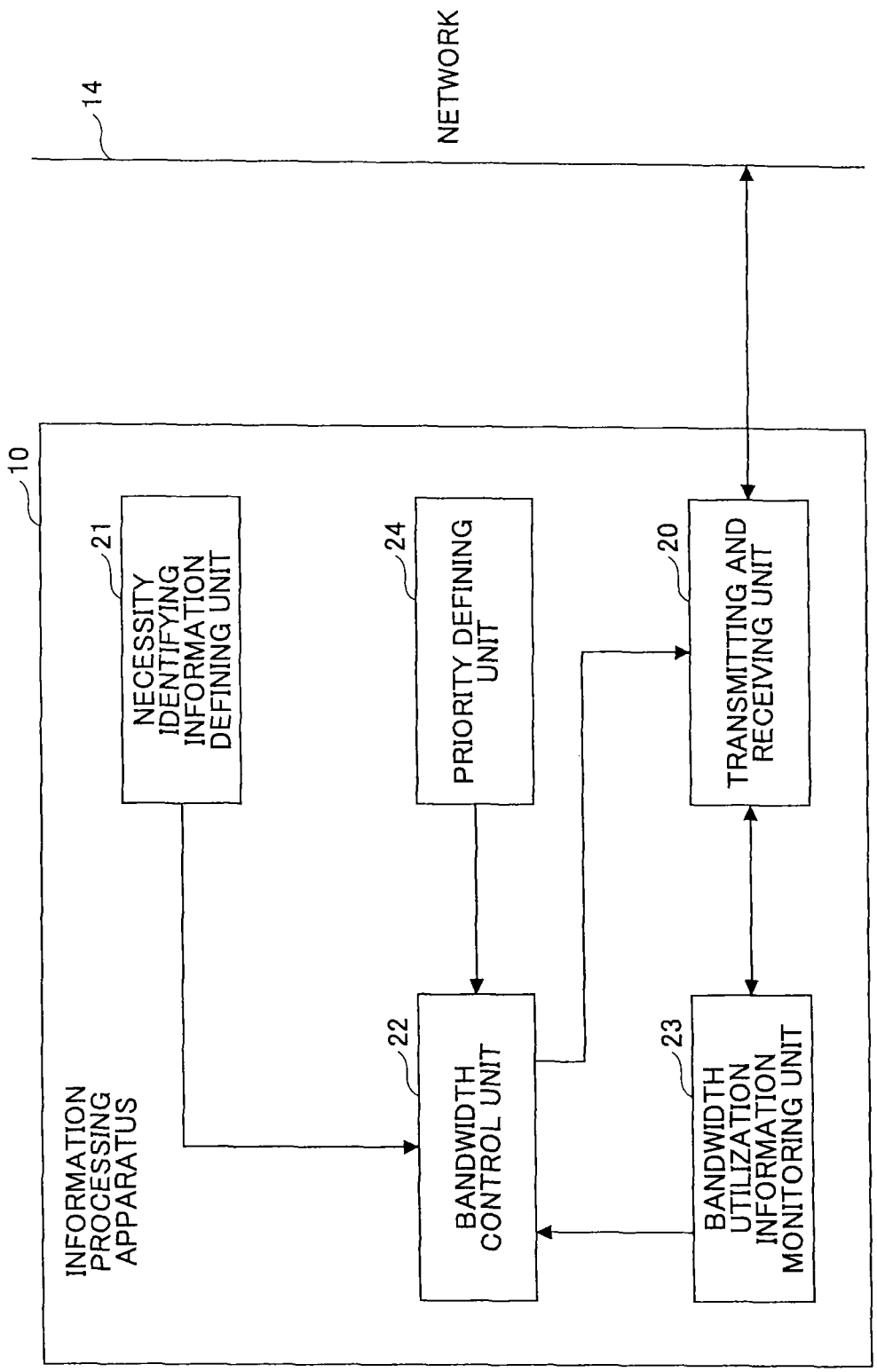
FIG. 2 is a functional block diagram illustrating one example of an information processing apparatus included in the conference system illustrated in FIG. 1.

FIG. 2 is a functional block diagram illustrating one example of an information processing apparatus included in the conference system illustrated in FIG. 1. The respective information processing apparatuses 10-12 have the same functions, so that only the information processing apparatus is described. The information processing apparatus 10 includes a transmitting and receiving unit 20 which transmits and receives at least one of the voice information of the voice input; the video information of the video imaged; and the screen information of the screen to be shared. The transmitting and receiving unit 20 is realized by a network I/F.

The information processing apparatus 10 includes a necessity identifying information defining unit 21 which allocates necessity identifying information for detecting a state of the information processing apparatus 10 and identifying presence/absence of necessity of transmitting and receiving of the voice information, the video information, and the screen information in accordance with the detected result. Moreover, the information processing apparatus 10 includes a bandwidth utilization information monitoring unit 23 which monitors in real time an available bandwidth; and a bandwidth control unit 22 which determines a bandwidth to be allocated to the respective voice information, video information, and screen information to be transmitted and received based on the necessity identifying information thereof. The necessity identifying information defining unit 21, the bandwidth control unit 22, and the bandwidth utilization information monitoring unit 23 are realized by the CPU reading from the storage apparatus having recorded thereon programs for executing processes thereof and executing them.

The bandwidth is a transmission path capacity, which is an upper limit of an amount of information that may be certainly transmitted via a transmission path. The bandwidth utilization information monitoring unit 23 monitors, in real time, the available transmission path capacity. The transmission path capacity may also be represented as a transferable bit rate (bps).

While the state of the information processing apparatus 10 is to be described below, it includes, as one example, a state in which the voice information is not received for a certain time period. For the necessity identifying information, which is set to be a necessity identifier in one example, "1" may be allocated in a case with necessity, while "0" may be allocated in a case without necessity. The necessity identifying information defining unit 21 sends results in which a necessity identifier is allocated to the respective information sets to the bandwidth control unit 22.

In addition to the above-described results, information on an available bandwidth that is obtained in real time by the bandwidth utilization information monitoring unit 23 is input to the bandwidth control unit 22. Based on the available bandwidth, the bandwidth control unit 22 determines a bandwidth to be allocated to information to which the necessity identifier "1" is allocated. Once the bandwidth is determined for all information sets to which the necessity identifier "1" is allocated, information on the determined bandwidth is sent to the transmitting and receiving unit 20. In accordance with the determined bandwidth, the transmitting and receiving unit 20 transmits and receives information to which the necessity identifier "1" is allocated.

Speaking of the above-described example, when it is detected that voice information has not been received for a certain time period, the necessity identifying information defining unit 21 allocates a necessity identifier "0" to the voice information received for the bandwidth control 22 to conduct control such that it is ensured the bandwidth is not secured for the voice information thereof to prevent the voice information from being received. In this way, it may be ensured to not receive unneeded information to avoid a situation in which a bandwidth is secured for the unneeded information. Moreover, a bandwidth may be optimized in accordance with a user utilization form specified from a state of a process being executed at the present, a communications state, and a state of functions of the information processing apparatus 10.

In FIG. 2, in addition to the above-described functional units, a priority defining unit 24 is provided. The priority defining unit 24 holds priority information which is predefined for the respective information sets and provides the priority information to the bandwidth control unit 22. The bandwidth control unit 22 refers to priority information provided and allocates a bandwidth in order from a higher priority except for information to which the necessity identifier "0" is allocated.

The priority information held by the priority defining unit 24, the bandwidth, and a time interval of bandwidth control conducted by the bandwidth control unit 22 may be defined or set in advance, but also can be customized by the user as needed. The smaller the time interval of the bandwidth control the higher the followability to the utilization format of the user, while the larger the time interval thereof, the smaller a CPU burden needed for control.

Figure 3:
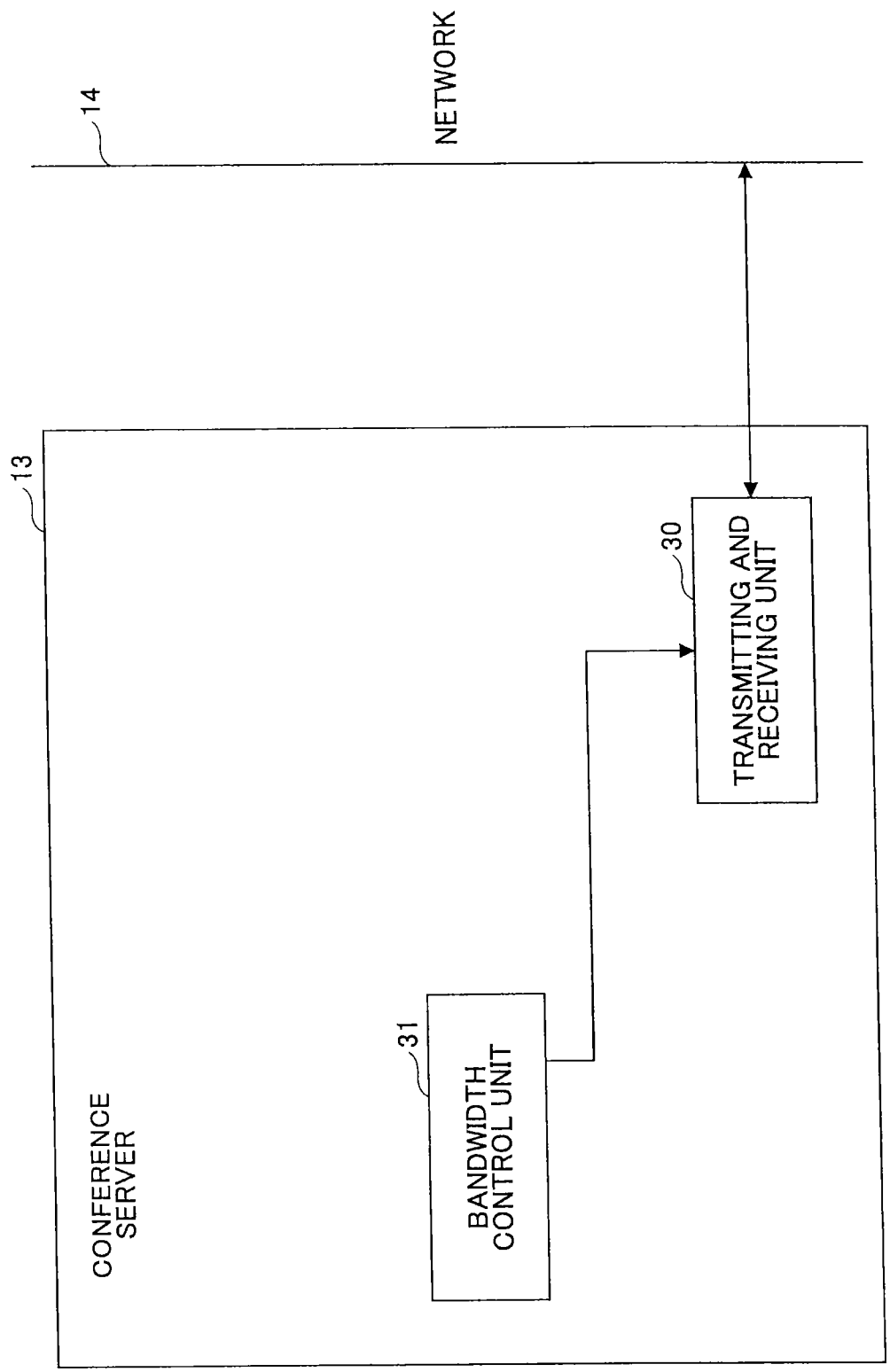
FIG. 3 is a functional block diagram illustrating one example of a conference server included in the conference system illustrated in FIG. 1.

FIG. 3 is a functional block diagram illustrating one example of the conference server 13 included in the conference system illustrated in FIG. 1. The conference server 13 receives information transmitted from the respective information processing apparatuses 10-12 and, with reference to a destination list management table, transmits the received information to the respective information processing apparatuses 10-12 to be a destination thereof. Thus, it includes a transmitting and receiving unit 30 which transmits and receives information. The transmitting and receiving unit is realized by a network I/F, while, a process of determining the destination is realized by the CPU reading and executing programs stored in the storage apparatus.

While the conference server 13 merely executes a process of transmitting received information to a destination, a necessary bandwidth is allocated and the transmitting and receiving unit 30 transmits and received information in accordance with the bandwidth, so that it includes a bandwidth control unit 31. Therefore, when the transmitting and receiving unit 30 receives information, the conference server refers to the destination list management table to determine the destination, and the bandwidth control unit 31 allocates a bandwidth to the above-described information to send the allocated result to the transmitting and receiving unit 30, which conducts transmission in accordance with the result thereof.

Figure 4:
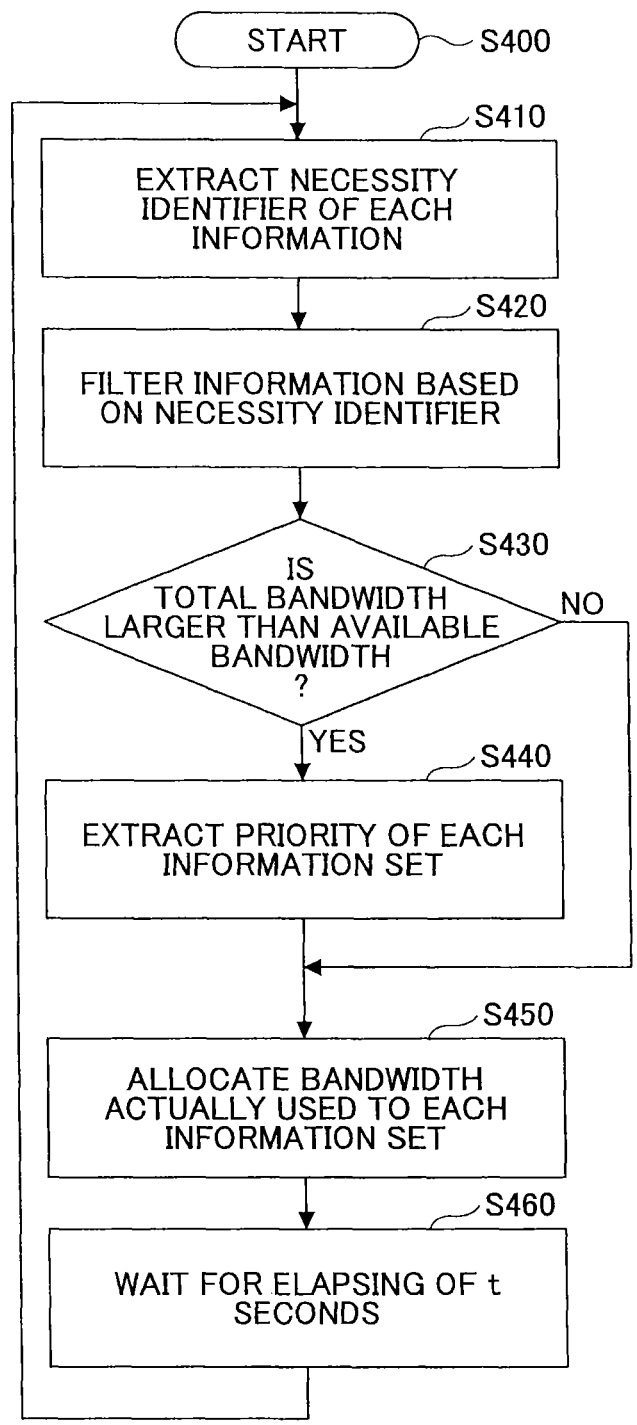
FIG. 4 is a flowchart illustrating a flow of a process which determines a bandwidth to be allocated to the respective information sets to be transmitted and received.

With reference to FIG. 4, a process actually performed by the information processing apparatus 10 is described in detail with reference to FIG. 4. FIG. 4 is a flowchart illustrating a flow of a process which determines a bandwidth to be allocated to the information sets to be transmitted and received. It is assumed that the information processing apparatus 10 is already logged in and used in a conference system. Moreover, it is assumed that, for the respective information set, the necessity identifying information defining unit 21 allocates a necessity identifier for identifying presence/absence of necessity and sends a result thereof to the bandwidth control unit 22.

Starting this process from step 400, the bandwidth control unit 22 extracts a necessity identifier of the respective information sets from results received. Then, in step 420, the bandwidth control unit 22 filters information based on the extracted necessity identifier. Filtering is a process in which unneeded information is removed from a target to which a bandwidth is allocated in order to ensure that a bandwidth is not allocated to unneeded information.

Information is sent on a bandwidth available in real time from the bandwidth utilization information monitoring unit 23 to the bandwidth control unit 22. In step 430, the bandwidth control unit 22 proceeds to allocate predefined bandwidths to necessary information, calculates a total of the bandwidths, refers to information on available bandwidth that is received, and determines whether the total bandwidth is larger than the available bandwidth.

If it is determined to be larger, the process proceeds to step 440, where the bandwidth control unit 22 extracts a priority of the respective information sets based on priority information provided from the priority defining unit 24. Then, the process proceeds to step 450. On the other hand, if it is determined to be smaller, the process directly proceeds to step 450.

In step 450, if the total bandwidth is smaller than the available bandwidth, a bandwidth may be allocated to any of necessary information sets, so that the bandwidth control unit 22 successively allocates a bandwidth to be actually used to the respective information sets and sends the result to the transmitting and receiving unit 20 and the transmitting and receiving unit 20 conducts transmission and reception in accordance with a result thereof.

If the total bandwidth is larger than the available bandwidth, a predefined bandwidth may not be allocated to some information sets, so that the bandwidth control unit 22 successively allocates the bandwidth starting from information with a high priority. Then, the bandwidth control unit 22 allocates a remaining bandwidth to remaining information. The bandwidth control unit 22 sends an allocated result to the transmitting and receiving unit 20 and waits for elapsing of t seconds in step 460. After the elapsing of t seconds, the process returns to step 410, where the bandwidth control unit 22 again performs the process of extracting necessity identifier of the respective information sets.

The above-mentioned t seconds is an arbitrary time period, so that a user may customize it as needed. This process is repeated until the conference is finished and the user logs off.

A description of a flow for determining the bandwidth shown in FIG. 4, showing a specific example, will be as follows. For example, the bandwidth control unit 22 creates a table as shown in FIG. 5. This table defines transmission of the respective information sets. In this table, a necessary bandwidth to be needed for the respective information sets is set in advance and a priority is obtained from the priority defining unit 24. It is assumed that 600 kbps is input as an available bandwidth from the bandwidth utilization information monitoring unit 23 and that the camera is turned OFF.

In the necessity identifying information defining unit 21, it is determined that there is no more input of video information and that transmitting the video information is not necessary based on detection information that the camera has been turned OFF. Then, the necessity identifying information defining unit 21 allocates the necessity identifier "0" to the video information and the necessity identifier "1" to the voice information and the screen information and inputs the allocated results to the table.

The bandwidth control unit 22 filters the video information of the necessity identifier "0" to remove the filtered video information, and adds necessary bandwidths of the voice information and the screen information within the table to calculate a total bandwidth when a necessary bandwidth is allocated to these information sets. In FIG. 5, it is 130 kbps for the voice information, while it is 428 kbps for the screen information. Thus, the bandwidth control unit 22 calculates the total bandwidth as 558 kbps.

The bandwidth control unit 22 determines whether the total bandwidth is larger than an available bandwidth obtained from the bandwidth utilization information monitoring unit 23. When the available bandwidth is 600 kbps, the total bandwidth is smaller, so that it is determined to be smaller. Then, based on the determined result, the bandwidth control unit 22 allocates 130 kbps as it is to the voice information and also allocates 428 kbps as it is to the screen information. This result is input into the table, so that the allocated bandwidth and the information are associated. A bandwidth 0 is input for filtered information. The bandwidth control unit 22 sends the associated bandwidth and information to the transmitting and receiving unit 20.

In the related art, a bandwidth is allocated in the order of higher priority and a bandwidth is also allocated to unneeded information, so that 130 kbps is allocated to the voice information with the highest priority, 420 kbps is allocated to the video information with the next highest priority, and the remaining 42 kbps out of the available 600 kbps is allocated to the screen information with the lowest priority. Thus, a bandwidth is allocated to unneeded video information and all of available bandwidths are used. Thus, using all of the available bandwidth 600 kbps means that bandwidth utilization efficiency is low and only a small bandwidth may be allocated to necessary screen information, so likelihood that a screen is interrupted in the middle is high, interfering with a smooth operation of the conference.

On the other hand, according to the present invention, a bandwidth is allocated only to necessary information, so that, for the available bandwidth of 600 kbps, the necessary bandwidth is small at 558 kbps and the remaining bandwidth may be used for other applications, so that bandwidth utilization efficiency is improved, making it possible to allocate a necessary bandwidth to necessary information and thus making it possible to smoothly conduct the conference without the screen being interrupted in the middle.

In the foregoing, a process of determining a bandwidth for the respective information sets has been described. Below, a method of allocating a necessity identifier to the respective information sets is described in detail with reference to specific examples. For each information set, two of the necessity identifiers for transmitting and receiving are provided. Moreover, the necessity identifier is determined in real time in accordance with a user utilization format and allocated.

In a first embodiment, which is as shown in the above-described example, the necessity identifying information defining unit 21 observes whether voice information is received from the other information processing apparatuses 11 and 12. The necessity identifying information defining unit 21 observes it for a certain time period, for t seconds, for example. Then, as a result thereof, if it is observed that it is not received, the necessity identifying information defining unit 21 determines that receiving of voice information is not necessary and allocates the necessity identifier "0" to received voice information. On the other hand, if it is observed that it is received, the necessity identifier "1" is allocated thereto.

For observing reception of this voice information, it is necessary to secure the bandwidth, which bandwidth is sufficiently smaller than a bandwidth necessary for receiving normal voice information. While the time interval for the observing may be arbitrarily set, it may be arranged to be the same as a time interval of the bandwidth control described above as an example.

In a second embodiment, the necessity identifying information defining unit 21 observes whether voice information is input from a voice input unit included in the information processing apparatus 10. When the necessity identifying information defining unit 21 does not observe input of voice information for a certain time period, t seconds, for example, it is determined that transmitting the voice information is not necessary since there is no voice information to be transmitted, and the necessity identifier "0" is allocated to the voice information to be transmitted. On the other hand, if it is observed that it is input, the necessity identifier "1" is allocated thereto. Similar to what is described in the above, the time interval for the observing may be set to be the same as the time interval for bandwidth control.

Figure 6:
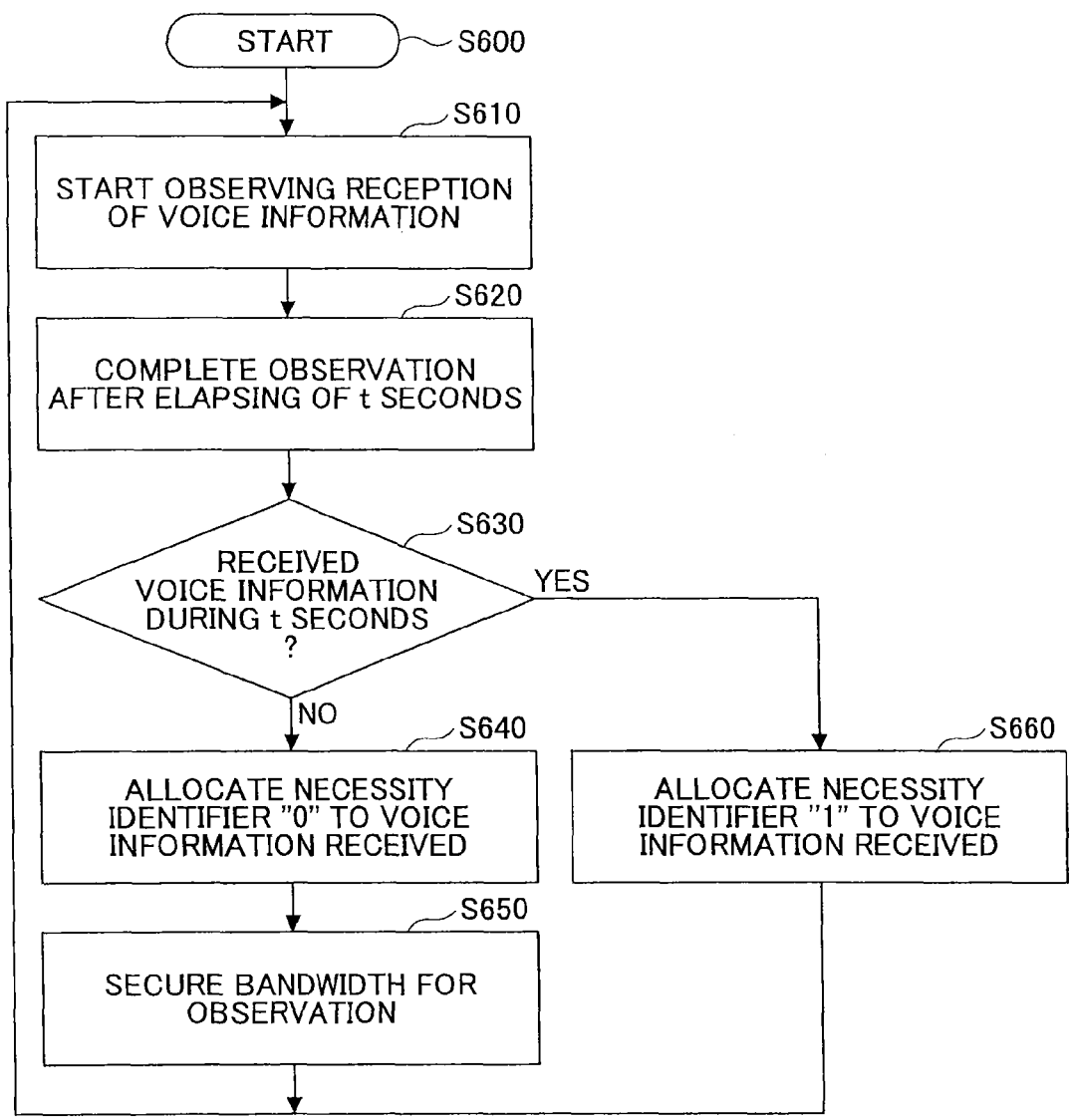
FIG. 6 is a flowchart illustrating a flow of a process in which reception of voice information is observed and the necessity identifier is allocated to voice information to be received in accordance with the observed results.

These processes will be described with reference to flowcharts shown in FIGS. 6 and 7. FIG. 6 is a diagram illustrating a flow of a process according to a first embodiment in which, whether the voice information is received from the other information processing apparatuses 11 and 12 is observed and the necessity identifier "0" or "1" is allocated to the voice information to be received in accordance with the observed results. This process is started from step 600 and, in step 610, the necessity identifying information defining unit 21 starts observing reception of the voice information via the transmitting and receiving unit 20. In step 620, the necessity identifying information defining unit 21 uses a timer, etc., to conduct observation until t seconds have elapsed and finishes the observation when t seconds have elapsed.

In step 630, the necessity identifying information defining unit 21 determines whether the voice information has been received from the other information processing apparatuses 11 and 12. If there is no reception of the voice information and only noise is received for t seconds, it is determined that the voice information is not received, and, if it is determined that there is reception of the voice information of some voice uttered by a counterpart, it is determined that the voice information is received even if the utterance is a single utterance.

If it is determined that the voice information is not received, the process proceeds to step 640, where the necessity identifying information defining unit 21 allocates the necessity identifier "0" to the voice information to be received. Then, in step 650, the necessity identifying information defining unit 21 secures a bandwidth for voice observation and returns to step 610. On the other hand, if it is determined that the voice information is received, the process proceeds to step S660, where the necessity identifying information defining unit 21 allocates the necessity identifier "1" to the voice information to be received and returns to step 610. Then, observation of reception of the voice information is started again. This is continued until the conference is finished and the user logs off.

Figure 7:
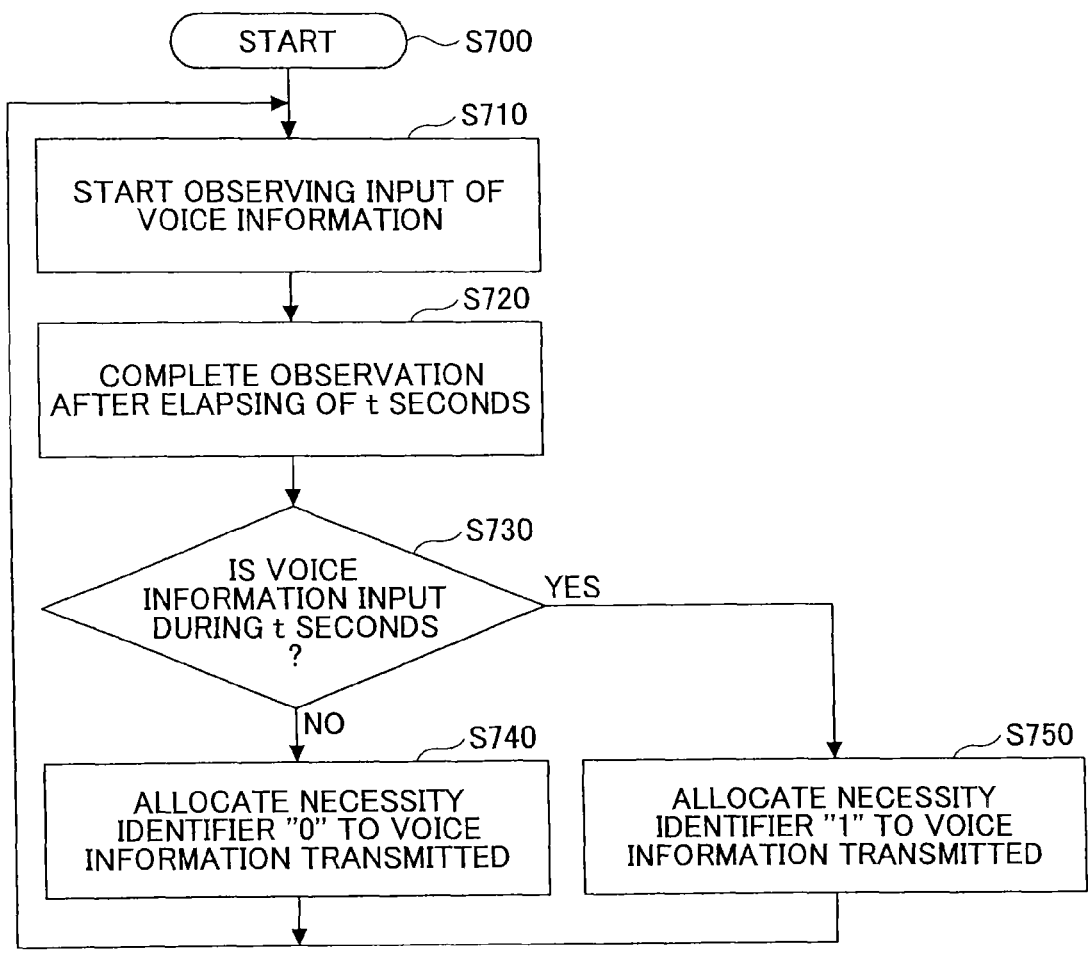
FIG. 7 is a flowchart illustrating a flow of a process in which input of voice information is observed and the necessity identifier is allocated to voice information to be transmitted in accordance with the observed results.

FIG. 7 is a diagram illustrating a flow of a process according to a second embodiment in which, whether voice information is received from a voice input unit is observed and a necessity identifier "0" or "1" is allocated to voice information to be transmitted in accordance with the observed results. This process is started from step 700 and, in step 710, observation of input of the voice information is started. In step 720, the necessity identifying information defining unit 21 uses a timer, etc., to conduct observation until t seconds have elapsed and finishes the observation when t seconds have elapsed.

In step 730, the necessity identifying information 21 determines whether the voice information has been input from the voice input unit. If there is no input of the voice information and only noise is received for t seconds, it is determined that the voice information is not input, and, if it is determined that there is input of the voice information of some voice uttered by a user, it is determined that the voice information is input even if the utterance is a single utterance.

If it is determined that the voice information is not input, the process proceeds to step S740, where the necessity identifying information defining unit 21 allocates the necessity identifier "0" to the voice information to be transmitted and returns to step 710. On the other hand, if it is determined that the voice information is input, the process proceeds to step S750, where the necessity identifying information defining unit 21 allocates the necessity identifier "1" to the voice information to be transmitted and returns to step 710. Then, observation of input of the voice information is started again. This is continued until the conference is finished and the user logs off.

While a method of allocating a necessity identifier to voice information to be transmitted and received has been described in the above, a method of allocating a necessity identifier to video information and screen information to be transmitted and received will be described in detail using an embodiment.

According to a third embodiment, the necessity identifying information defining unit 21 detects whether the camera function has been turned ON or OFF. The necessity identifying information defining unit 21 detects whether the camera function has been turned ON or OFF, and allocates the necessity identifier "0" or "1" to video information to be transmitted in accordance with the detected result. When the camera function is turned ON, it is necessary to transmit the video information, so that the necessity identifier "1" is allocated, while, when it is turned OFF, it is not necessary to transmit the video information, so that the necessity identifier "0" is allocated.

Figure 8:
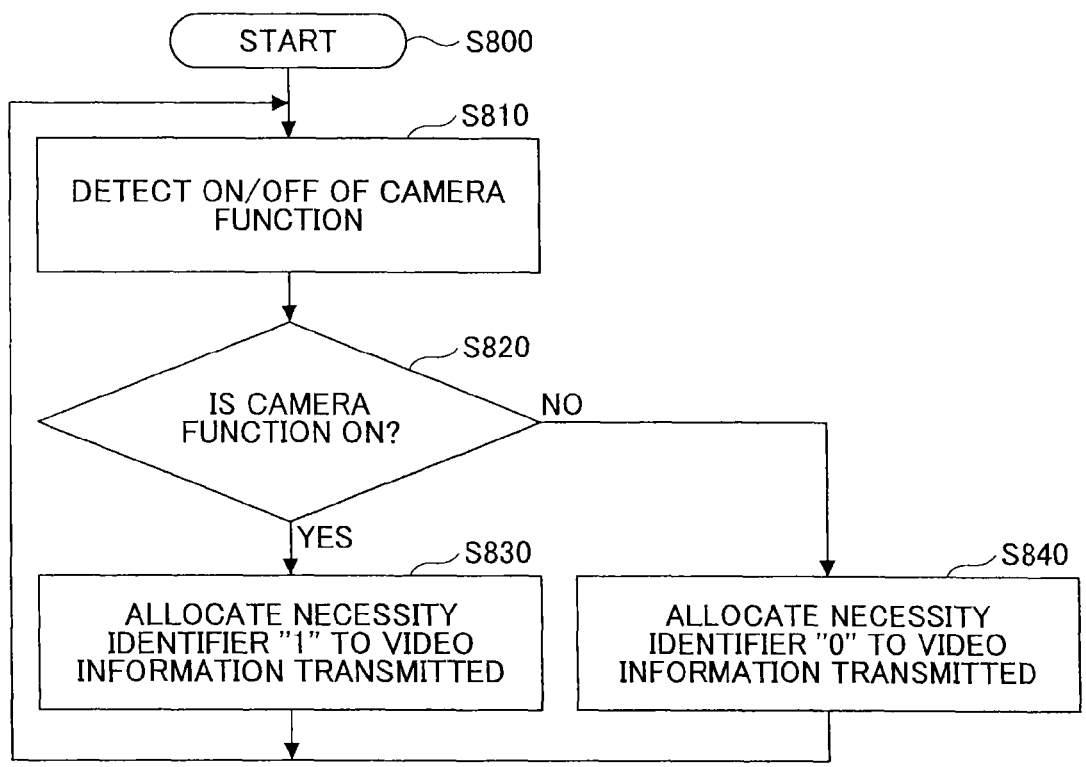
FIG. 8 is a flowchart illustrating a flow of a process in which ON/OFF of a camera function is detected and the necessity identifier is allocated to video information to be transmitted in accordance with the detected results.

This process is described in detail with reference to FIG. 8. This process is started from step 800, and, in step 810, the necessity identifying information defining unit 21 detects whether the camera function is ON or OFF. In step 820, the necessity identifying information defining unit 21 determines whether the detected result is that the camera function is ON. When the camera function is ON, the process proceeds to step 830, where the necessity identifier "1" is allocated to video information to be transmitted. On the other hand, when it is OFF, the process proceeds to step 840, where the necessity identifying information defining unit 21 allocates the necessity identifier "0" to the video information to be transmitted. Thereafter, the process returns to step 810, and this process is repeated until the user logs off.

A fourth embodiment is such that the information processing apparatus 10 is a cell phone or a smart phone and includes a proximity sensor (a proximity detecting unit). The proximity sensor is a sensor which is non-contact and which detects that an object to be detected has approached within a certain distance. When making a call, the cell phone or the smart phone is used while causing it to be in proximity to the ears. Then, the user cannot image himself, and also cannot see an expression of a counterpart or refer to material. Therefore, transmitting and receiving of video information and screen information are unnecessary. Then, where it is caused to be in proximity to the ears is detected by the proximity sensor, and, if it is detected that it is caused to be in proximity thereto, transmitting and receiving of unnecessary video information and screen information are stopped.

Figure 9:
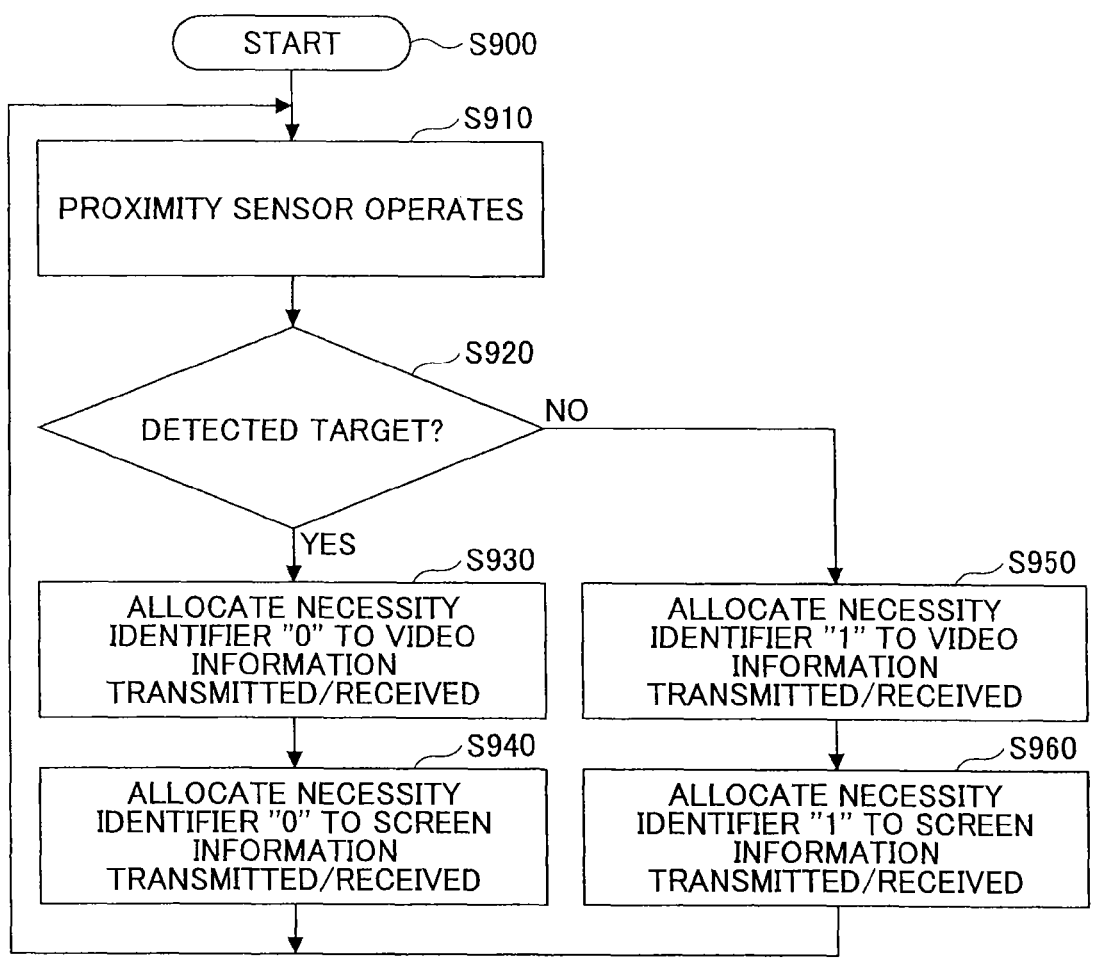
FIG. 9 is a flowchart illustrating a flow of a process in which presence/absence of proximity is detected by a proximity sensor and the necessity identifier is allocated to video information and screen information to be transmitted and received in accordance with the detected results.

A process executed then is described in detail with reference to FIG. 9. This process is started from step 900 and, in step 910, the proximity sensor operates. When an object to be detected approaches the proximity sensor within a certain distance, the proximity sensor operates and executes the detection thereof. In step 920, it is determined whether a target object is detected in conjunction with the proximity sensor having operated.

If the target object is detected, it is in proximity to the ears, so that the process proceeds to step 930 and the necessity identifying information defining unit 21 allocates the necessity identifier "0" to the video information to be transmitted and received based on the result thereof. Next, in step 940, the necessity identifying information defining unit allocates the necessity identifier "0" to screen information to be transmitted and received. After these are determined, it returns to step 910, where it waits for the proximity sensor to operate again.

If the object to be detected is not detected, it is not proximate to the ears, so that the process proceeds to step 950, where the necessity identifying information defining unit 21 allocates the necessity identifier "1" to the video information to be transmitted and received based on the result thereof. Next, in step 960, the necessity identifying information defining unit 21 allocates the necessity identifier "1" to screen information to be transmitted and received. After allocating, similar to what is described in the above, the process returns to step 910, waiting for the proximity sensor to operate again. Also for this embodiment, this process is repeated until the user logs off.

According to a fifth embodiment, the necessity identifying information defining unit 21 detects whether a speaker function has been turned ON or OFF. The necessity identifying information defining unit 21 detects whether the speaker function has been turned ON or OFF, and allocates the necessity identifier "0" or "1" to video information and screen information to be transmitted and received in accordance with the detected result. While the speaker is used when conversing while looking at a displayed screen, it is turned OFF while conducting a call. Therefore, when the speaker function is turned off, it is supposed that a call is being conducted. While conducting the call, video or material cannot be viewed as described above, so that it is not necessary to transmit and receive video information and screen information. Then, when the speaker function is turned OFF, transmitting and receiving of the video information and the screen information are stopped.

Figure 10:
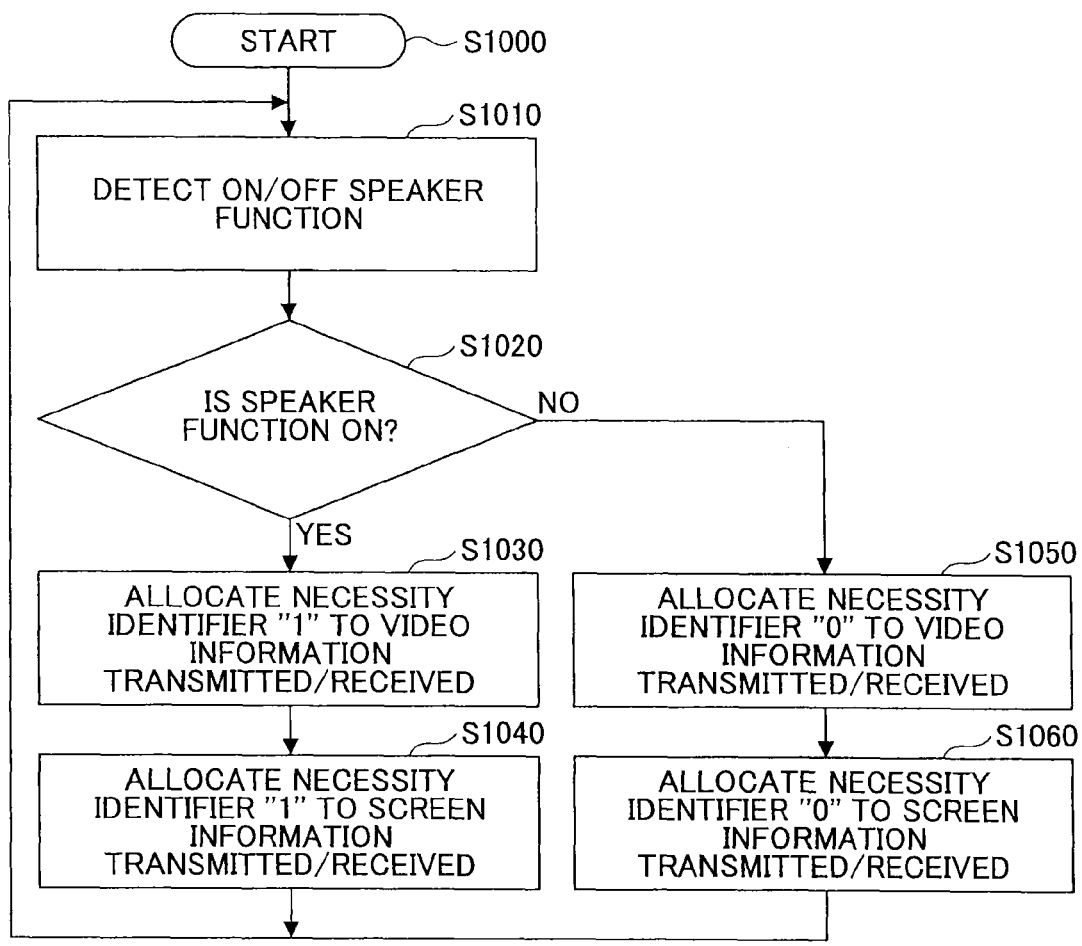
FIG. 10 is a flowchart illustrating a flow of a process in which ON/OFF of a speaker function is detected and the necessity identifier is allocated to the video information and the screen information to be transmitted and received in accordance with the detected results.

A process executed then is described in detail with reference to FIG. 10. This process is started from step 1000, and, in step 1010, the necessity identifying information defining unit 21 detects whether the speaker function is ON or OFF. Then, in step 1020, when the detected result is speaker function ON, the necessity identifying information defining unit 21 proceeds to step 1030.

In step 1030, it is supposed that a call is not being conducted, so that, in order to conduct transmission and reception of the video information, the necessity identifying information defining unit 21 allocates the necessity identifier "1" to the video information to be transmitted and received. Moreover, in order to also transmit and receive the screen information, in step 1040, the necessity identifying information defining unit 21 allocates the necessity identifier "1" to the screen information to be transmitted and received. After the allocation, the process returns to step 1010, waiting until the speaker function is turned OFF.

When the detected result in step 1020 is that the speaker function is OFF, the process proceeds to 1050 and, as it is supposed that a call is being conducted, to stop transmission and reception of the video information, the necessity identifying information defining unit 21 allocates the necessity identifier "0" to the video information to be transmitted and received. Moreover, in order to also stop transmission and reception of the screen information, in step 1060, the necessity identifying information defining unit 21 allocates the necessity identifier "0" to the screen information to be transmitted and received. After the allocation, the process returns to step 1010, waiting until the speaker function is turned ON. This process is also repeated until the user is logged off.

According to a sixth embodiment, replaying of video and conference material is often performed in background, such as the user viewing a different screen during the conference, so it is detected whether it is in a background operation. Here, the different screen includes a different document, table, diagram, Web page, etc. A background operation, which is a process which is not to be operated by the user, is a process with a low priority order. The necessity identifying information defining unit 21 detects whether it is in the background operation, and allocates the necessity identifier "0" or "1" to video information and screen information to be received in accordance with the detected result. When it is in the background operation, the user is not viewing the video information of video or the screen information of screen, so it is ensured not to receive the video information and the screen information.

Figure 11A:
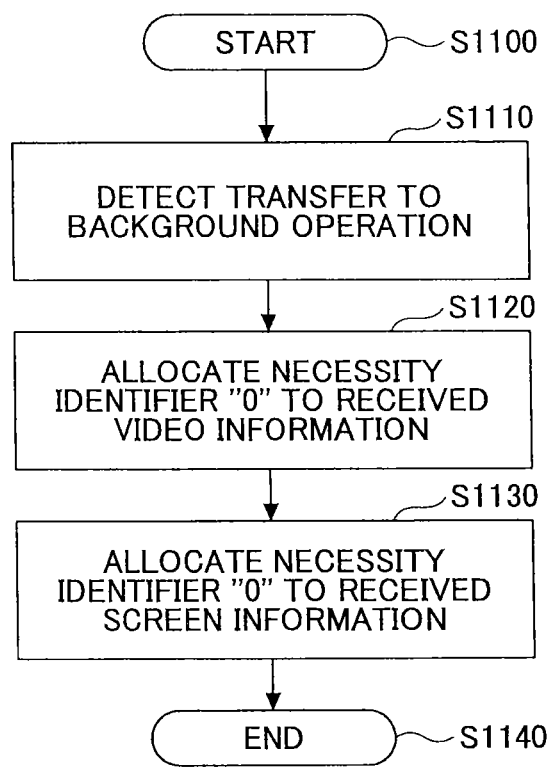
FIGS. 11A and 11B are flowcharts illustrating a flow of a process in which presence/absence of a background operation is detected and the necessity identifier is allocated to the video information and the screen information to be transmitted and received in accordance with the detected results.

A process executed then is described in detail with reference to FIG. 11A. This process is started from step 1100, and the necessity identifying information defining unit 21 monitors whether it has transferred to the background operation and detects that it has actually transferred in step 1110. In step 1120, the necessity identifying information defining unit 21 allocates the necessity identifier "0" to video information received. Next, in step 1130, the necessity identifying information defining unit 21 allocates the necessity identifier "0" to the screen information to be received and finishes this process in step 1140. This allocation makes it possible to conduct control such that it is ensured the video information and the screen information are not received.

Figure 11B:
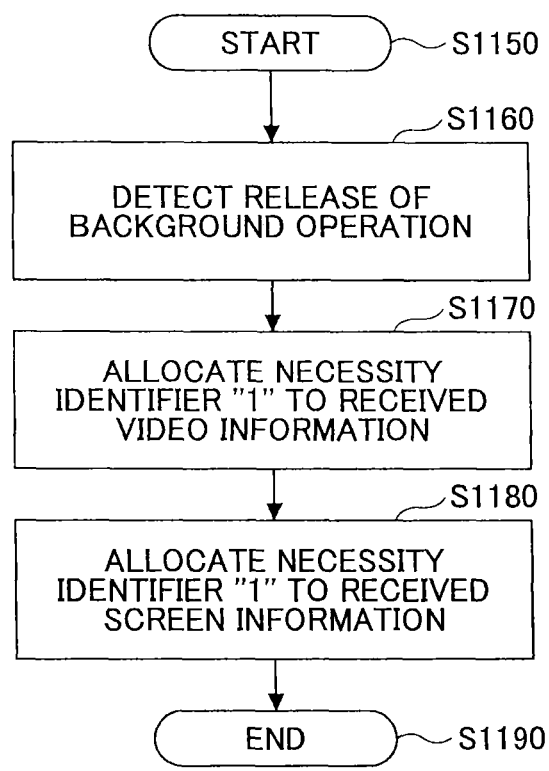

A flow of a process in a case in which the background operation is released after transferring to the background operation is shown in FIG. 11B. Starting the process from step 1150, the necessity identifying information defining unit 21 detects that it has actually been released in step 1160. In step 1170, the necessity identifying information defining unit 21 allocates the necessity identifier "1" to video information to be received. This is to receive the video information and to cause the received video information to be displayed on a screen. Next, in step 1180, the necessity identifying information defining unit 21 allocates the necessity identifier "1" to the screen information received and finishes this process in step 1190.

While a method of allocating a necessity identifier has been described using the embodiments in the foregoing, the method is not to be limited to these embodiments as long as a state of the information processing apparatus 10 may be detected and the necessity identifier "0" or "1" may be allocated in accordance with the detected result, so that, for example, ON/OFF of a microphone may be detected and the necessity identifier may be allocated in accordance with the detected result. By the way, when the microphone is ON, the voice information is input, so that the necessity identifier "1" is allocated to voice information to be transmitted, while, when the microphone is OFF, the voice information is not input, so that the necessity identifier "0" is allocated to the voice information to be transmitted.

Moreover, when the information processing apparatus 10 is a cell phone, a smart phone, a tablet terminal, a notebook PC, etc., and a speaker function is turned OFF, whether a microphone is being inserted into an earphone jack may be detected, and a necessity identifier may be allocated in accordance therewith. This is because it is not necessarily the case that a call is being conducted when the speaker function is turned OFF, and there may also be a case that the headphone is inserted. As the screen may be viewed when the headphone is inserted, it is necessary to transmit and receive all of the voice information, the video information, and the screen information, so that the necessity identifier "1" is allocated to all of the information sets.

Figure 12:
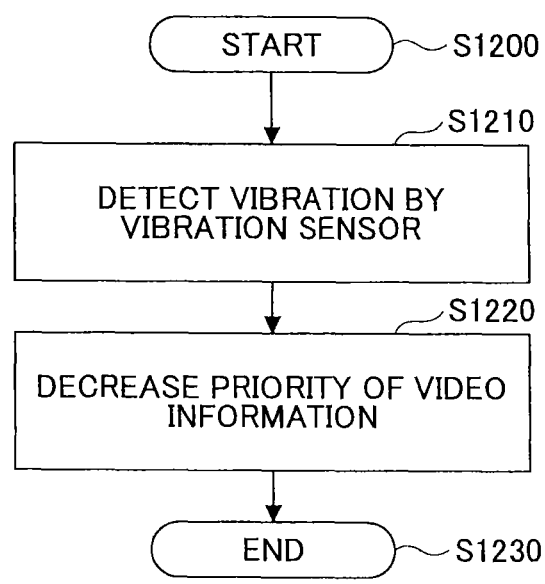
FIG. 12 is a flowchart illustrating a flow of a process in which a vibration is detected by a vibration sensor, and a priority of video information is adjusted in response to the detection thereof.

Next, a process of adjusting a priority is described in detail with reference to FIGS. 12 and 13. One embodiment in which the priority is adjusted is configured such that the information processing apparatus 10 is a smart phone or a tablet terminal and includes a vibration sensor (a vibration detecting unit). The vibration sensors, which are sensors for detecting whether an apparatus is vibrating, include an acceleration sensor which detects acceleration. In a state in which the apparatus is vibrating, blurring occurs in a camera for imaging, so that it is not possible to take clear video. Even when such video is transmitted as video information, the counterpart may not recognize an expression or a figure.

A conference system assumes that voice of the counterpart can be heard in conducting a conference and is characterized by being able to see an expression of the counterpart. In addition, it is ensured that there is a screen to which material may also be referred. Therefore, a priority order of information to be transmitted and received is generally in the order of voice information, video information, and screen information, while it is not limited thereto.

However, when video degrades due to vibration as described above, it is desirable to lower the priority order of the video information to be transmitted. FIG. 12 is a flowchart illustrating a flow of a process in which a vibration is detected, and the priority order is lowered in response to the result thereof. This process is started from step 1200, and, in step 1210, the vibration is detected by a vibration sensor. In response thereto, in step 1220, the bandwidth control unit 22 lowers the priority order of the video information included in the priority information provided from the priority defining unit 24 and this process is completed in step 1230. The bandwidth control unit 22 may cause the priority order to be lowered by changing the priority, so that the priority order after the change is in the order of the voice information, the screen information, and the video information.

It is desirable that the priority order is changed not only by a vibration of an apparatus, but also by a surrounding illuminance. Quality of video imaged may be affected by whether illuminance is greater than or equal a certain reference value, so that, when it is less than the certain reference value, not only an expression, but also who is being imaged may not be recognized. Moreover, even when a bandwidth is allocated to these video information sets to transmit the video information sets, sufficient quality may not be secured. Then, the information processing apparatus 10 may include an illuminance sensor (an illuminance measuring unit). The illuminance sensor, which is a sensor for detecting brightness of a light source, outputs a value of brightness of light irradiated.

FIG. 13 is a flowchart illustrating a flow of process in which a priority is adjusted in accordance with illuminance. This process is started from step 1300, and, in step 1310, illuminance is detected by an illuminance sensor. Detection of this illuminance may be performed in certain time intervals. As an example, it may be carried out in the same intervals as the time intervals of the above-described bandwidth control.

In step 1320, the bandwidth control unit 22 determines whether the detected illuminance is greater than or equal to a certain reference value. If it is determined to be less than the certain reference value, the process proceeds to step 1330, where the priority of the video information is decreased and this process is finished in step 1350. If it is determined to be greater than or equal to the certain reference value, the process proceeds to step 1340, where the priority of the video information is moved back to a default value and this process is finished in step 1350.

As described above, only information needed in accordance with user utilization format is transmitted and received, and it is ensured that unneeded information is neither transmitted nor received, making it possible to increase a bandwidth available for a different application and thereby making it possible to improve bandwidth utilization efficiency. Moreover, eliminating the transmission and reception of unneeded information makes it possible to reduce a network burden and decrease consumed power of the information processing apparatus. When the information processing apparatus is driven with a battery, battery energy consumption efficiency may be improved.

Moreover, when quality of video is poor when a vibration is detected or when illuminance is less than a certain reference value, video of adequate quality may not be displayed even when transmitting and receiving it, so that a priority thereof may be lowered, and moved back to a predefined default priority when the vibration ceases to exist or when the illuminance becomes greater than or equal to the certain reference value. The priority of the video information may be lowered to improve quality of the voice information and the screen information and it may be moved back to an original priority when it becomes possible to secure at least certain quality for the video information to provide video information of at least the certain quality.

While adjustment of the priority may be performed by detecting the above-described vibration or measuring illuminance, it is not limited thereto, so that, for example, a presently residing location can be detected from GPS (Global Positioning System) and map information and it can be determined whether the location is a location with intense noise, and a sensor which measures noise can be provided, so that the noise can be measured with the sensor and it can be determined whether it is at least a certain value, and a priority of the voice information to be transmitted can also be adjusted in accordance with the determined result.

In the foregoing, the present invention has been described with the embodiments described above as an information processing apparatus and a conference system, and computer programs which are executed by the information processing apparatus. However, the present invention is not limited to those embodiments shown therein. Thus, modifications may be made thereto within the scope a skilled person would have arrived at, such as other embodiments, additions, changes, deletions, etc., and are to be included in the scope of the present invention as long as they achieve the operation and advantages of the present invention in any of the modes thereof.

The present application is based on and claims the benefit of priority of Japanese Priority Application No. 2012-133668 filed on Jun. 13, 2012, the entire contents of which are hereby incorporated by reference.

The invention claimed is:

1. An information processing apparatus which controls transmission and reception of information, comprising:
    a transmitting and receiving unit which transmits and receives, as the information, at least one of voice information of voice input, video information of video imaged, and screen information of a screen to be shared;
    a necessity identifying information defining unit which allocates necessity identifying information for detecting a state of the information processing apparatus and identifying presence/absence of a necessity of transmitting and receiving the voice information, the video information, and the screen information in accordance with the detected state; and
    a bandwidth control unit which determines a bandwidth to be allocated to each of the voice information, the video information, and the screen information to be transmitted and received, based on the necessity identifying information, wherein the transmitting and receiving unit transmits and receives the voice information, the video information, and the screen information in accordance with the determined bandwidth, wherein the necessity identifying information defining unit detects whether the voice information has been received within a certain time period, and, if the voice information has not been received, the necessity identifying information which indicates that it is not necessary to receive is allocated to the voice information to be received, and wherein the bandwidth control unit determines that the bandwidth is not to be secured for the voice information to be received.

2. A conference system, comprising:
at least two information processing apparatuses as claimed in claim 1; and
a conference server which relays transmission and reception of information among the at least two information processing apparatuses.

3. An information processing apparatus which controls transmission and reception of information, comprising:
a transmitting and receiving unit which transmits and receives, as the information, at least one of voice information of voice input, video information of video imaged, and screen information of a screen to be shared;
a necessity identifying information defining unit which allocates necessity identifying information for detecting a state of the information processing apparatus and identifying presence/absence of a necessity of transmitting and receiving the voice information, the video information, and the screen information in accordance with the detected state; and
a bandwidth control unit which determines a bandwidth to be allocated to each of the voice information, the video information, and the screen information to be transmitted and received, based on the necessity identifying information, wherein the transmitting and receiving unit transmits and receives the voice information, the video information, and the screen information in accordance with the determined bandwidth, wherein the necessity identifying information defining unit detects whether a voice has been input from a voice input unit that inputs the voice within a certain time period, and, if the voice information has not been input, the necessity identifying information which indicates that it is not necessary to transmit is allocated to the voice information to be transmitted, and wherein the bandwidth control unit determines that the bandwidth is not to be secured for the voice information to be transmitted.

4. A conference system, comprising:
at least two information processing apparatuses as claimed in claim 3; and
a conference server which relays transmission and reception of information among the at least two information processing apparatuses.

5. An information processing apparatus which controls transmission and reception of information, comprising:
a transmitting and receiving unit which transmits and receives, as the information, at least one of voice information of voice input, video information of video imaged, and screen information of a screen to be shared;
a necessity identifying information defining unit which allocates necessity identifying information for detecting a state of the information processing apparatus and identifying presence/absence of a necessity of transmitting and receiving the voice information, the video information, and the screen information in accordance with the detected state; and
a bandwidth control unit which determines a bandwidth to be allocated to each of the voice information, the video information, and the screen information to be transmitted and received, based on the necessity identifying information, wherein the transmitting and receiving unit transmits and receives the voice information, the video information, and the screen information in accordance with the determined bandwidth, wherein the necessity identifying information defining unit detects whether an imaging function realized by an imaging unit that images the video has been turned ON or OFF, and, if the imaging function has been turned OFF, the necessity identifying information which indicates that it is not necessary to transmit is allocated to the voice information to be transmitted, and wherein the bandwidth control unit determines that the bandwidth is not to be secured for the video information to be transmitted.

6. A conference system, comprising:
at least two information processing apparatuses as claimed in claim 5; and
a conference server which relays transmission and reception of information among the at least two information processing apparatuses.

7. An information processing apparatus which controls transmission and reception of information, comprising:
a transmitting and receiving unit which transmits and receives, as the information, at least one of voice information of voice input, video information of video imaged, and screen information of a screen to be shared;
a necessity identifying information defining unit which allocates necessity identifying information for detecting a state of the information processing apparatus and identifying presence/absence of a necessity of transmitting and receiving the voice information, the video information, and the screen information in accordance with the detected state; and
a bandwidth control unit which determines a bandwidth to be allocated to each of the voice information, the video information, and the screen information to be transmitted and received, based on the necessity identifying information, wherein the transmitting and receiving unit transmits and receives the voice information, the video information, and the screen information in accordance with the determined bandwidth, wherein if it is detected that a distance to a user is within a certain value using a proximity detecting unit, the necessity identifying information defining unit allocates the necessity identifying information which indicates that it is not necessary to conduct transmission and reception of at least one of the video information and the screen information to be transmitted and received, and wherein the bandwidth control unit determines that the bandwidth is not to be secured for the at least one of the video information and the screen information to be transmitted and received.

8. A conference system, comprising:
at least two information processing apparatuses as claimed in claim 7; and a conference server which relays transmission and reception of information among the at least two information processing apparatuses.

9. An information processing apparatus which controls transmission and reception of information, comprising:
a transmitting and receiving unit which transmits and receives, as the information, at least one of voice information of voice input, video information of video imaged, and screen information of a screen to be shared;
a necessity identifying information defining unit which allocates necessity identifying information for detecting a state of the information processing apparatus and identifying presence/absence of a necessity of transmitting and receiving the voice information, the video information, and the screen information in accordance with the detected state; and
a bandwidth control unit which determines a bandwidth to be allocated to each of the voice information, the video information, and the screen information to be transmitted and received, based on the necessity identifying information,
wherein the transmitting and receiving unit transmits and receives the voice information, the video information, and the screen information in accordance with the determined bandwidth,
wherein the necessity identifying information defining unit detects whether a voice output function which is realized by a voice output unit that ouputs voice has been turned OFF, and, when the voice output function has been turned off, allocates the necessity identifying information which indicates that it is not necessary to conduct transmission and reception of at least one of the video information and the screen information to be transmitted and received, and
wherein the bandwidth control unit determines that the bandwidth is not to be secured for the at least one of the video information and the screen information to be transmitted and received.

10. A conference system, comprising:
at least two information processing apparatuses as claimed in claim 9; and
a conference server which relays transmission and reception of information among the at least two information processing apparatuses.

11. An information processing apparatus which controls transmission and reception of information, comprising:
a transmitting and receiving unit which transmits and receives, as the information, at least one of voice information of voice input, video information of video imaged, and screen information of a screen to be shared;
a necessity identifying information defining unit which allocates necessity identifying information for detecting a state of the information processing apparatus and identifying presence/absence of a necessity of transmitting and receiving the voice information, the video information, and the screen information in accordance with the detected state; and
a bandwidth control unit which determines a bandwidth to be allocated to each of the voice information, the video information, and the screen information to be transmitted and received, based on the necessity identifying information,
wherein the transmitting and receiving unit transmits and receives the voice information, the video information, and the screen information in accordance with the determined bandwidth,
wherein the necessity identifying information defining unit detects whether transmission and reception of the voice information, the video information, and the screen information operate in background, and, if the transmission and reception operate in the background, allocates the necessity identifying information which indicates that it is not necessary to receive at least one of the video information and the screen information to be received, and
wherein the bandwidth control unit determines that the bandwidth is not to be secured for the at least one of the video information and the screen information to be received.

12. An information processing apparatus which controls transmission and reception of information, comprising:
a transmitting and receiving unit which transmits and receives, as the information, at least one of voice information of voice input, video information of video imaged, and screen information of a screen to be shared;
a necessity identifying information defining unit which allocates necessity identifying information for detecting a state of the information processing apparatus and identifying presence/absence of a necessity of transmitting and receiving the voice information, the video information, and the screen information in accordance with the detected state;
a bandwidth control unit which determines a bandwidth to be allocated to each of the voice information, the video information, and the screen information to be transmitted and received, based on the necessity identifying information; and
a priority defining unit which holds priority information which defines an order in which the bandwidth is allocated to the voice information, the video information, and the screen information to be transmitted and provides the priority information to the bandwidth control unit,
wherein the transmitting and receiving unit transmits and receives the voice information, the video information, and the screen information in accordance with the determined bandwidth, and
wherein the bandwidth control unit determines the bandwidth to be allocated to respective information sets in accordance with the priority information except for information for which it is determined that the bandwidth is not to be secured.

13. The information processing apparatus as claimed in claim 12, further comprising a vibration detecting unit for detecting whether the information processing apparatus is vibrating, wherein the priority defining unit changes the priority information in response to the vibration detecting unit detecting a vibration.

14. The information processing apparatus as claimed in claim 12, further comprising an illuminance measuring unit for measuring a surrounding illuminance of the information processing apparatus, wherein the priority defining unit changes the priority information in accordance with the illuminance measured by the illuminance measuring unit.

15. A non-transitory computer-readable storage medium storing computer-readable instructions that, when executed by a computer, cause the computer to perform a method for controlling transmission and reception of information, the method comprising:
transmitting and receiving, as the information, at least one of voice information of voice input, video information of video imaged, and screen information of a screen to be shared;

allocating necessity identifying information for detecting a state of an information processing apparatus and identifying presence/absence of a necessity of transmitting and receiving the voice information, the video information, and the screen information in accordance with the detected state; and determining a bandwidth to be allocated to each of the voice information, the video information, and the screen information to be transmitted and received, based on the necessity identifying information, wherein the at least one of the voice information, the video information, and the screen information is transmitted and received in accordance with the determined bandwidth, wherein if the voice information has not been received within a certain time period, the necessity identifying information which indicates that it is not necessary to receive is allocated to the voice information to be received, and wherein it is determined that the bandwidth is not to be secured for the voice information to be received.

16. A non-transitory computer-readable storage medium storing computer-readable instructions that, when executed by a computer, cause the computer to perform a method for controlling transmission and reception of information, the method comprising:

transmitting and receiving, as the information, at least one of voice information of voice input, video information of video imaged, and screen information of a screen to be shared;

allocating necessity identifying information for detecting a state of an information processing apparatus and identifying presence/absence of a necessity of transmitting and receiving the voice information, the video information, and the screen information in accordance with the detected state; and determining a bandwidth to be allocated to each of the voice information, the video information, and the screen information to be transmitted and received, based on the necessity identifying information, wherein the at least one of the voice information, the video information, and the screen information is transmitted and received in accordance with the determined bandwidth, wherein if the voice information has not been input within a certain time period, the necessity identifying information which indicates that it is not necessary to transmit is allocated to the voice information to be transmitted, and wherein it is determined that the bandwidth is not to be secured for the voice information to be transmitted.

17. A non-transitory computer-readable storage medium storing computer-readable instructions that, when executed by a computer, cause the computer to perform a method for controlling transmission and reception of information, the method comprising:

transmitting and receiving, as the information, at least one of voice information of voice input, video information of video imaged, and screen information of a screen to be shared;

allocating necessity identifying information for detecting a state of an information processing apparatus and identifying presence/absence of a necessity of transmitting and receiving the voice information, the video information, and the screen information in accordance with the detected state; and determining a bandwidth to be allocated to each of the voice information, the video information, and the screen information to be transmitted and received, based on the necessity identifying information, wherein the at least one of the voice information, the video information, and the screen information is transmitted and received in accordance with the determined bandwidth, wherein, when it is determined that the imaging function has been turned OFF, the necessity identifying information which indicates that it is not necessary to transmit is allocated to the voice information to be transmitted, and wherein it is determined that the bandwidth is not to be secured for the video information to be transmitted.

18. A non-transitory computer-readable storage medium storing computer-readable instructions that, when executed by a computer, cause the computer to perform a method for controlling transmission and reception of information, the method comprising:

transmitting and receiving, as the information, at least one of voice information of voice input, video information of video imaged, and screen information of a screen to be shared;

allocating necessity identifying information for detecting a state of an information processing apparatus and identifying presence/absence of a necessity of transmitting and receiving the voice information, the video information, and the screen information in accordance with the detected state; and determining a bandwidth to be allocated to each of the voice information, the video information, and the screen information to be transmitted and received, based on the necessity identifying information, wherein the at least one of the voice information, the video information, and the screen information is transmitted and received in accordance with the determined bandwidth, wherein if it is detected that a distance to a user is within a certain value, the necessity identifying information which indicates that it is not necessary to conduct transmission and reception of at least one of the video information and the screen information to be transmitted and received is allocated, and wherein it is determined that the bandwidth is not to be secured for the at least one of the video information and the screen information to be transmitted and received.

19. A non-transitory computer-readable storage medium storing computer-readable instructions that, when executed by a computer, cause the computer to perform a method for controlling transmission and reception of information, the method comprising:

transmitting and receiving, as the information, at least one of voice information of voice input, video information of video imaged, and screen information of a screen to be shared;

allocating necessity identifying information for detecting a state of an information processing apparatus and identifying presence/absence of a necessity of transmitting and receiving the voice information, the video information, and the screen information in accordance with the detected state; and determining a bandwidth to be allocated to each of the voice information, the video information, and the screen information to be transmitted and received, based on the necessity identifying information, wherein the at least one of the voice information, the video information, and the screen information is transmitted and received in accordance with the determined bandwidth, wherein the necessity identifying information defining unit detects whether a voice output function which is realized by a voice output unit that ouputs voice has been turned OFF, and, when the voice output function has been turned off, allocates the necessity identifying information which indicates that it is not necessary to conduct transmission and reception of at least one of the video information and the screen information to be transmitted and received, and wherein the bandwidth control unit determines that the bandwidth is not to be secured for the at least one of the video information and the screen information to be transmitted and received.

* * * * *